(12) United States Patent
Lin

(10) Patent No.: US 8,902,351 B2
(45) Date of Patent: Dec. 2, 2014

(54) AUTO-FOCUS METHOD

(71) Applicant: Hon Hai Precision Industry Co., Ltd., New Taipei (TW)

(72) Inventor: Kuo-Hung Lin, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/904,043

(22) Filed: May 29, 2013

(65) Prior Publication Data

US 2014/0146222 A1 May 29, 2014

(30) Foreign Application Priority Data

Nov. 23, 2012 (TW) .............................. 101143856 A

(51) Int. Cl.
*H04N 5/232* (2006.01)
(52) U.S. Cl.
CPC .................................. *H04N 5/23212* (2013.01)
USPC .......................................... 348/357; 348/345
(58) Field of Classification Search
CPC ... H04N 5/23212; H04N 5/2254; G03B 7/08; G03B 13/00; G03B 13/36; G03B 17/00; G02B 7/09; G02B 7/282

See application file for complete search history.

(56) References Cited

U.S. PATENT DOCUMENTS

| | | | | |
|---|---|---|---|---|
| 7,693,411 | B2 * | 4/2010 | Kwon et al. ................... | 396/127 |
| 8,049,811 | B2 * | 11/2011 | Gamadia et al. .............. | 348/345 |
| 8,731,388 | B1 * | 5/2014 | Chen et al. ...................... | 396/89 |
| 2011/0058093 | A1 * | 3/2011 | Kim ............................... | 348/345 |

* cited by examiner

*Primary Examiner* — Luong T Nguyen
(74) *Attorney, Agent, or Firm* — Novak Druce Connolly Bove + Quigg LLP

(57) ABSTRACT

An auto-focus method to determine an optimum position of a lens module includes defining search boundaries and an allowable difference, randomly sampling current values within the search boundaries $d_1$, $d_2$ and $d_3$, and obtaining sharpness $m_1$, $m_2$ and $m_3$. A parabola is determined where a vertex of the parabola is used as a next input current value where three larger values of the sharpness are used along with corresponding current values to re-determine a new parabola. Three current values are sampled and a corresponding current value is used to re-determine a new parabola and according to a comparison of the sharpness values, the lens module is driven to auto-focus.

4 Claims, 2 Drawing Sheets

AUTO-FOCUS METHOD

BACKGROUND

1. Technical Field

The present disclosure relates to an auto-focus technologies, and particularly to an auto-focus method capable of finding a focused position.

2. Description of Related Art

In order to change a relative positions between a lens module and a sensing element, a camera module uses an auto-focus function uses a voice coil motor to drive the lens module, and focuses the lens module to get a sharp image. A commonly used image analytic function is a modulation transfer function (MTF). In order to improve searching for an optimum focus position, a larger searching space to calculate the MTF values one by one is used, and when the MTF value is over a peak value, a searching space is narrowed for recalculating the MTF value. The above steps are repeated until the peak value over by the MTF value no longer changes, then the auto-focus function is completed. But when the MTF curve shows a little oscillation, it is easy to search only in regional peaks, rather than a global peak. Therefore, it is necessary to provide a focus position searching method to avoid falling into a regional peak.

DETAILED DESCRIPTION

Figure 1:
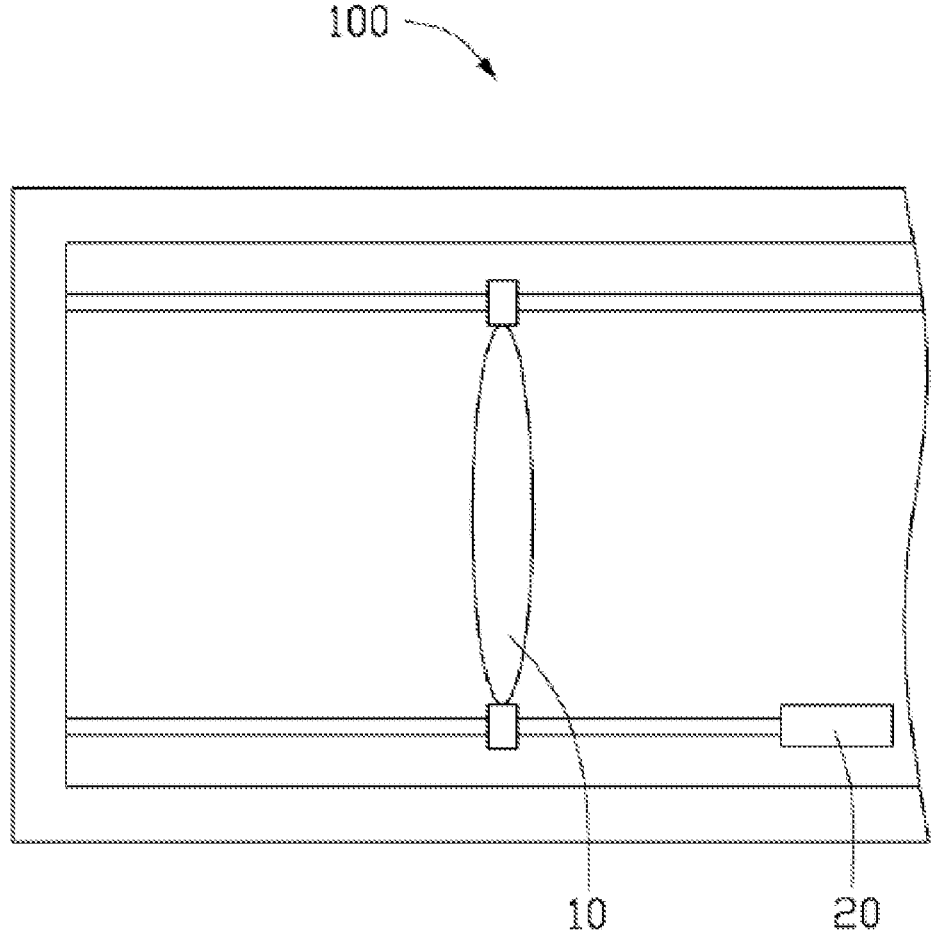
FIG. 1 is a cross-sectional schematic view of a lens module in accordance with an exemplary embodiment.

Embodiments of the disclosure will be described with reference to the drawings. In FIG. 1, an auto-focus method, according to an exemplary embodiment, is used in an electronic device, such as camera and telephone, that includes a lens module 100. The lens module 100 includes a focusing lens 10 and a voice coil motor (VCM) 20 for driving the focusing lens 10 to move within a focus range of the lens module 100. An image captured by the lens module 100 is changed with a position of the focusing lens 10. The VCM 20 converts an input current into an impelling force for the lens module 100, where the input current corresponds to a displacement of the lens module 100. In other words, the lens module 100 according to the input current moves to different positions, in order to obtain a sharp image.

Figure 2:
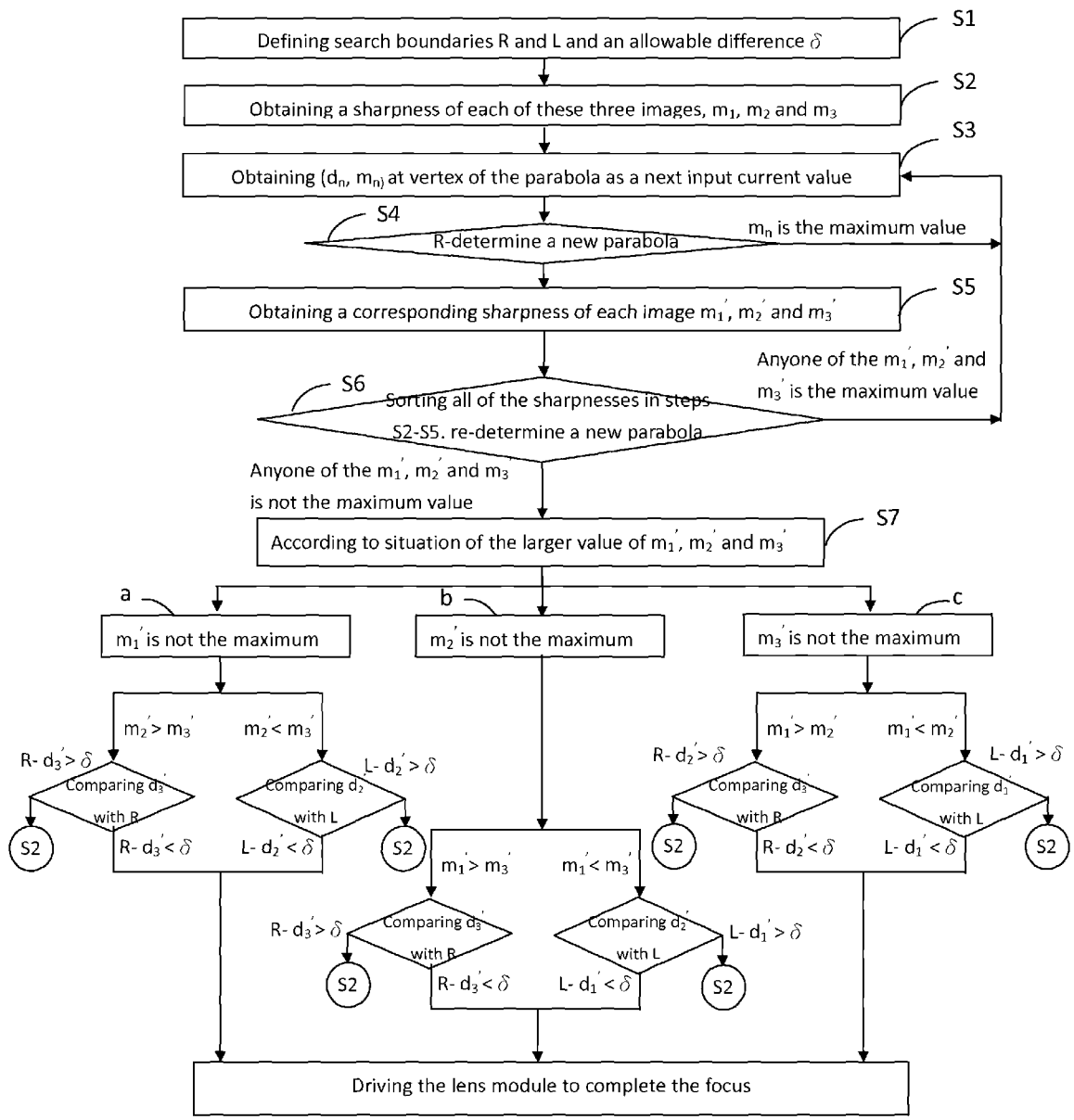
FIG. 2 is a flowchart of a method for auto-focus in accordance with an exemplary embodiment.

FIG. 2 is a flowchart of a method for auto-focus in accordance with an exemplary embodiment In the present embodiment a method for auto-focus includes steps S1 to S7 as follows:

In step S1, a search boundary of the input current and an allowable difference of the input current are defined, where the input current is in an operating current range of a voice coil motor 20, a left boundary is denoted as L, a right boundary is denoted as R, and the allowable difference is denoted as δ, where |R−L| is greater than δ. The value of δ is less than or equal to 0.05; in the embodiment the value is less than or equal to 0.01. The search boundary is set in an allowable input current range for the voice coil motor 20.

In step S2, three current values are randomly sampled within the search boundaries $d_1$, $d_2$ and $d_3$, separately to move the lens module 100 to corresponding positions in order to capture three images, and to calculate and record a sharpness of each images, $m_1$, $m_2$ and $m_3$. In the present embodiment, the sharpness of the image can be obtained by the following formula MTF=(High−Low)/(High+Low), where High=Ave+0.6(Max−Ave), Low=Ave−0.6(Ave−Min), Ave is an average value of a gray scale, Max is a maximum value of the gray scale, Min is a minimum value of the gray scale. Gray scale may be in any one of red, green, and blue.

In step S3, three points from three coordinates $(d_1, m_1)$, $(d_2, m_2)$, and $(d_3, m_3)$ are used to determine a parabola, and a horizontal coordinate $d_1$, at vertex of the parabola is used as a next input current value, then a corresponding sharpness of the image $m_1$, can be obtained. The current value is used as a vertical coordinate and the sharpness of the image is used as a horizontal coordinate to establish a coordinate system. A curve simultaneously passes through the three points $(d_1, m_1)$, $(d_2, m_2)$, and $(d_3, m_3)$ which is obtained by using a tracing point method, and a horizontal coordinate $d_n$, at vertex of the curve can be obtained, then the $d_n$, is used to drive the lens module 100 to move to a corresponding position and capturing an image, a sharpness of the image $m_1$, is then calculated and recorded.

In step S4, the $m_n$, $m_1$, $m_2$, and $m_3$ are sorted, if $m_n$, is the maximum value in the $m_n$, $m_1$, $m_2$, and $m_3$, then returning to step S3, three larger values in the $m_n$, $m_1$, $m_2$, and $m_3$ and the corresponding current values are used to re-determine a new parabola; conversely, if the $m_n$, is not the maximum value in the $m_n$, $m_1$, $m_2$, and $m_3$, entering into step S5.

In step S5, three current values within the search boundaries $d_1'$, $d_2'$ and $d_3'$ are sampled, separately to move the lens module 100 to a corresponding positions in order to capture three images, and to calculate and record a sharpness of each image $m_1'$, $m_2'$ and $m_3'$, wherein $d_1'=L+r(R-L)$, $d_2'=L+r(d_1'-L)$, and $d_3'=L+r(R-d_1)$, r is a golden section point 0.618.

In step S6, all of the sharpnesses in steps S2-S5 are sorted, if anyone of the $m_1'$, $m_2'$ and $m_3'$ is the maximum value, then returning to S3, three larger values in all of the sharpnesses and the corresponding current values are used to re-determine a new parabola; if anyone of the $m_1'$, $m_2'$ and $m_3'$ is not the maximum value, entering into step S7.

In step S7, according to a situation of the larger value of the $m_1'$, $m_2'$ and $m_3'$, and if $m_1'$ is not the maximum value but a larger value in the $m_1'$, $m_2'$ and $m_3'$ go to step a; if $m_2'$ is not the maximum value in the $m_1'$, $m_2'$ and $m_3'$ go to step b; if $m_3'$ is not the maximum value of the $m_1'$, $m_2'$ and $m_3'$ go to step c.

In step a, if $m_2'>m_3'$, the left boundary is re-defined as $d_3'$, the $d_3'$ is compared with the R, if R−$d_3'$ is less than δ, then the larger value corresponds to the current value within the sharpness of the image corresponding to R, $m_1'$, $m_2'$ and $m_3'$ is used to drive the lens module 100 to complete the focus; if R−$d_3'$ is greater than δ, returning to S2, three current values are randomly sampled within the re-defined left and right search boundaries, and a corresponding sharpness of the images can be obtained; if $m_2'<m_3'$, the right boundary is re-defined as $d_2'$, if L−$d_2'$ is less than δ, then the larger value corresponds to the current value within the sharpness of the image corresponding to L, $m_1'$, $m_2'$ and $m_3'$ are used to drive the lens module 100 to complete the focus; if L−$d_2'$ is greater than δ, returning to S2, three current values are randomly sampled within the re-defined left and right search boundaries, and a corresponding sharpness of the images can be obtained.

In step b, if $m_1'>m_3'$, the left boundary is re-defined as $d_3'$, the $d_3'$ is compared with the R, if R−$d_3'$ is less than δ, then the larger value corresponds to the current value within the sharpness of the image corresponding to R, $m_1'$, $m_2'$ and $m_3'$ is used to drive the lens module 100 to complete the focus; if R−$d_3'$ is greater than δ, returning to S2, three current values are randomly sampled within the re-defined left and right search boundaries, and a corresponding sharpness of the images can be obtained; if $m_1'<m_3'$, the right boundary is re-defined as $d_1'$, and if $L-d_1'$ is less than $\delta$, then the larger value corresponds to the current value within the sharpness of the image corresponding to L, $m_1'$, $m_2'$ and $m_3'$ is used to drive the lens module 100 to complete the focus; if $L-d_1'$ is greater than $\delta$, returning to S2, three current values are randomly sampled within the re-defined left and right search boundaries, and a corresponding sharpness of the images can be obtained.

In step c, if $m_1'>m_2'$, the left boundary is re-defined as $d_2'$, the d; is compared with the R, and if $R-d_2'$ is less than $\delta$, then the larger value corresponds to the current value within the sharpness of the image corresponding to R, $m_1'$, $m_2'$ and $m_3'$ is used to drive the lens module 100 to complete the focus; if $R-d_2'$ is greater than $\delta$, returning to S2, three current values are randomly sampled within the re-defined left and right search boundaries, and a corresponding sharpness of the images can be obtained; if $m_1'<m_2'$, the right boundary is re-defined as $d_1'$, if $L-d_1'$ is less than $\delta$, then the larger value corresponds to the current value within the sharpness of the image corresponding to L, $m_1'$, $m_2'$ and $m_3'$ is used to drive the lens module 100 to complete the focus; if $L-d_1'$ is greater than $\delta$, returning to S2, three current values are randomly sampled within the re-defined left and right search boundaries, and a corresponding sharpness of the images can be obtained.

For the focus position searching method in the present embodiment, an interpolated search method is used for searching and establishing the best focus current, compared to the global search method the number of searches is reduced, searching time is reduced, and the auto-focus method has both accuracy and efficiency. Combined with a golden section method, the left and the right boundaries are continuously moving rightward and leftward and the search boundaries are pinched until expectations are achieved, the searching results can thus avoid falling into a regional peak.

Although the present disclosure has been specifically described on the basis of these exemplary embodiments, the disclosure is not to be construed as being limited thereto. Various changes or modifications may be made to the embodiments without departing from the scope and spirit of the disclosure.

What is claimed is:

1. An auto-focus method used to determine an optimum position of a lens module, the lens module driven by a voice coil motor (VCM), the VCM moving according to an input current to drive the lens module, the auto-focus method, comprising:
   S1: defining a search boundary of the input current and an allowable difference of the input current, where the input current is in an operating current range of the voice coil motor, a left boundary denoted as L, a right boundary denoted as R, and the allowable difference denoted as $\delta$, wherein $|R-L|$ is greater than $\delta$;
   S2: randomly sampling three current values within the search boundaries $d_1$, $d_2$ and $d_3$, separately; moving the lens module to corresponding positions in order to capture three images, and calculating and recording a sharpness of each images, $m_1$, $m_2$ and $m_3$;
   S3: determining a parabola from three points from three coordinates $(d_1, m_1)$, $(d_2, m_2)$, and $(d_3, m_3)$, and using a horizontal coordinate $d_n$ at vertex of the parabola as a next input current value, and obtaining a corresponding sharpness of the image $m_n$;
   S4: sorting the $m_n$, $m_1$, $m_2$, and $m_3$; if $m_n$ is the maximum value in the $m_n$, $m_1$, $m_2$, and $m_3$, then returning to step S3, using three larger values in the $m_n$, $m_1$, $m_2$, and $m_3$ and the corresponding current values to re-determine a new parabola; if the $m_n$ is not the maximum value in the $m_n$, $m_1$, $m_2$, and $m_3$, entering into step S5;
   S5: sampling three current values within the search boundaries $d_1'$, $d_2'$ and $d_3'$, separately, moving the lens module to a corresponding positions in order to capture three images, and calculating and recording a sharpness of each image $m_1'$, $m_2'$ and $m_3'$, wherein $d_1'=L+r(R-L)$, $d_2'=L+r(d_1'-L)$, and $d_3'=L+r(R-d_1')$, r is a golden section point 0.618;
   S6: sorting all of the sharpnesses in steps S2-S5; if anyone of the $m_1'$, $m_2'$ and $m_3'$ is the maximum value, then returning to S3, using three larger values in all of the sharpnesses and the corresponding current values to re-determine a new parabola; if anyone of the $m_1'$, $m_2'$ and $m_3'$ is not the maximum value, entering into step S7; and
   S7:
   a: if $m_1'$ is not the maximum value but a larger value in the $m_1'$, $m_2'$ and $m_3'$, and if $m_2'>m_3'$, the left boundary is re-defined as $d_3'$, comparing the $d_3'$ with the R, if $R-d_3'$ is less than $\delta$, then using the larger value corresponds to the current value within the sharpness of the image corresponding to R, $m_1'$, $m_2'$ and $m_3'$ to drive the lens module to complete the focus; if $R-d_3'$ is greater than $\delta$, returning to S2, randomly sampling three current values within the re-defined left and right search boundaries, and obtaining a corresponds sharpness of the images; if $m_2'<m_3'$, the right boundary is re-defined as $d_2'$, if $L-d_2'$ is less than $\delta$, then using the larger value corresponds to the current value within the sharpness of the image corresponding to L, $m_1'$, $m_2'$ and $m_3'$ to drive the lens module to complete the focus; if $L-d_2'$ is greater than $\delta$, returning to S2, randomly sampling three current values within the re-defined left and right search boundaries, and obtaining a corresponds sharpness of the images;
   b: if $m_2'$ is not the maximum value in the $m_1'$, $m_2'$ and $m_3'$, and if $m_1'>m_3'$, the left boundary is re-defined as $d_3'$, comparing the $d_3'$ with the R, if $R-d_3'$ is less than $\delta$, then using the larger value corresponds to the current value within the sharpness of the image corresponding to R, $m_1'$, $m_2'$ and $m_3'$ to drive the lens module to complete the focus; if $R-d_3'$ is greater than $\delta$, returning to S2, randomly sampling three current values within the re-defined left and right search boundaries, and obtaining a corresponds sharpness of the images; if $m_1'<m_3'$, the right boundary is re-defined as $d_1'$, if $L-d_1'$ is less than $\delta$, then using the larger value corresponds to the current value within the sharpness of the image corresponding to L, $m_1'$, $m_2'$ and $m_3'$ to drive the lens module to complete the focus; if $L-d_1'$ is greater than $\delta$, returning to S2, randomly sampling three current values within the re-defined left and right search boundaries, and obtaining a corresponds sharpness of the images;
   c: if $m_3'$ is not the maximum value of the $m_1'$, $m_2'$ and $m_3'$, and if $m_1'>m_2'$, the left boundary is re-defined as $d_2'$, the $d_2'$ is compared with the R, if $R-d_2'$ is less than $\delta$, then using the larger value corresponds to the current value within the sharpness of the image corresponding to R, $m_1'$, $m_2'$ and $m_3'$ to drive the lens module to complete the focus; if $R-d_2'$ is greater than $\delta$, returning to S2, randomly sampling three current values within the re-defined left and right search boundaries, and obtaining a corresponds sharpness of the images; if $m_1'<m_2'$, the right boundary is re-defined as $d_1'$, if $L-d_1'$ is less than $\delta$, then using the larger value corresponds to the current value within the sharpness of the image corresponding to L, $m_1'$, $m_2'$ and $m_3'$ to drive the lens module to complete the focus; if $L-d_1'$ is greater than $\delta$, returning to S2, randomly sampling three current values within the re-defined left and right search boundaries, and obtaining a corresponding sharpness of the images.

2. The auto-focus method as claimed in claim 1, wherein the allowable difference is less than or equal to 0.05.

3. The auto-focus method as claimed in claim 2, wherein the allowable difference is less than or equal to 0.01.

4. The auto-focus method as claimed in claim 1, wherein the sharpness of the image can be obtained by following formula MTF=(High−Low)/(High+Low), where, MTF represents for modulation transfer function, High=Ave+0.6(Max−Ave), Low=Ave−0.6(Ave−Min), Ave is an average value of a gray scale, Max is a maximum value of the gray scale, Min is a minimum value of the gray scale.

* * * * *